(12) United States Patent
Jiang et al.

(10) Patent No.: US 11,382,039 B2
(45) Date of Patent: Jul. 5, 2022

(54) TERMINAL STATE INDICATING METHOD, TERMINAL STATE DETERMINING METHOD, BASE STATION AND TERMINAL

(71) Applicant: VIVO MOBILE COMMUNICATION CO., LTD., Guangdong (CN)

(72) Inventors: Dajie Jiang, Chang'an Dongguan (CN); Fei Qin, Chang'an Dongguan (CN); Xiaodong Shen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 193 days.

(21) Appl. No.: 16/634,555

(22) PCT Filed: Jun. 28, 2018

(86) PCT No.: PCT/CN2018/093327
§ 371 (c)(1),
(2) Date: Jan. 27, 2020

(87) PCT Pub. No.: WO2019/024629
PCT Pub. Date: Feb. 7, 2019

(65) Prior Publication Data
US 2021/0007053 A1   Jan. 7, 2021

(30) Foreign Application Priority Data

Jul. 31, 2017  (CN) .......................... 201710642684.9

(51) Int. Cl.
*H04W 52/02* (2009.01)
*H04W 72/04* (2009.01)
(Continued)

(52) U.S. Cl.
CPC ..... *H04W 52/0235* (2013.01); *H04W 52/028* (2013.01); *H04W 52/0293* (2013.01);
(Continued)

(58) Field of Classification Search
CPC .................................................. H04W 52/0235
See application file for complete search history.

(56) References Cited

U.S. PATENT DOCUMENTS

| | | | |
|---|---|---|---|
| 2009/0147865 A1* | 6/2009 | Zhang | H04B 7/0641 375/259 |
| 2010/0223328 A1 | 9/2010 | Haataja et al. | |

(Continued)

FOREIGN PATENT DOCUMENTS

| | | |
|---|---|---|
| CN | 102047638 A | 5/2011 |
| CN | 103096419 A | 5/2013 |

(Continued)

OTHER PUBLICATIONS

CN Search Report dated Nov. 12, 2019 as received in Application No. 201710642684.9.

(Continued)

*Primary Examiner* — James P Duffy
(74) *Attorney, Agent, or Firm* — Maschoff Brennan

(57) ABSTRACT

A terminal state indicating method, a terminal state determining method, a base station and a terminal are provided. The terminal state indicating method includes: transmitting a subsequence in a predetermined subsequence set, the predetermined subsequence set includes at least one subsequence, each of the at least one subsequence is configured to indicate that at least two terminals are in a target state, and the target state includes a wake-up state or a sleep state.

20 Claims, 3 Drawing Sheets

(51) Int. Cl.
    *H04W 76/28*     (2018.01)
    *H04W 76/27*     (2018.01)

(52) U.S. Cl.
    CPC ......... *H04W 72/042* (2013.01); *H04W 76/27* (2018.02); *H04W 76/28* (2018.02)

(56) References Cited

U.S. PATENT DOCUMENTS

| | | |
|---|---|---|
| 2014/0050133 A1 | 2/2014 | Jafarian et al. |
| 2015/0124706 A1 | 5/2015 | Kim et al. |

FOREIGN PATENT DOCUMENTS

| | | |
|---|---|---|
| WO | 2014/056174 A1 | 4/2014 |
| WO | 2016/053656 A1 | 4/2016 |
| WO | 2016/063083 A1 | 4/2016 |
| WO | 2016/204933 A1 | 12/2016 |

OTHER PUBLICATIONS

CN Office Action dated Nov. 22, 2019 as received in Application No. 201710642684.9.

Sequans Communications. "Discussion on Wake-up Signal for Power Consumption Reduction for FeNB-IoT," RI-1709161, 3GPP TSG-RAN WGJ #89, pp. 1-3 (May 10, 2017).

Sequans Communications. "Discussion on Wake-up Signal for Power Consumption Reduction for FeNB-IoT," RI-1707781, 3GPP TSG-RAN WGJ #89, pp. 1-3 (May 5, 2017).

CN Office Action in Application No. 201710642684.9 dated Nov. 22, 2019.

"On 'wake-up signal' for paging and connected-mode DRX", 3GPP TSG RAN WG1 Meeting #88bis, Apr. 3, 2017.

"Discussion on wake-up signal for power consumption reduction for feNB-IoT", 3GPPTSG-RAN WG1 #89, May 15, 2017.

Written Opinion and International Search Report in Application No. PCT/CN2018/093327 dated Feb. 13, 2020.

European Search Report in Application No. 18842399.0 dated Sep. 7, 2020.

"On "wake-up signal" for paging and connected-mode—DRX" 3GPP TSG RAN WG1 Meeting #89, May 15, 2017.

"Power consumption evaluation of wake-up signal technique for feNBIoT" 3GPP TSG RAN WG1 Meeting #89, May 15, 2017.

EP Office Action dated Aug. 11, 2021 as received in Application No. 18842399.0.

\* cited by examiner

TERMINAL STATE INDICATING METHOD, TERMINAL STATE DETERMINING METHOD, BASE STATION AND TERMINAL

CROSS-REFERENCE TO RELATED APPLICATION

This application is the U.S. national phase of PCT Application No. PCT/CN2018/093327 filed on Jun. 28, 2018, which claims a priority to Chinese Patent Application No. 201710642684.9 filed on Jul. 31, 2017, both disclosures of which are incorporated in their entireties by reference herein.

TECHNICAL FIELD

The present disclosure relates to the technical field of communication applications, and in particular to a terminal state indicating method, a terminal state determining method, a base station and a terminal.

BACKGROUND

In Long Term Evolution (LTE) or $5^{th}$ Generation (5G) communication systems, user equipment (UE) in a radio resource control (RRC) idle state needs to detect a paging signal transmitted by a base station at the pre-configured time. The process of detecting the paging signal is as follows: blindly detecting a physical downlink control channel (PDCCH) corresponding to a P-RNTI (Paging-RNTI); if the PDCCH is not detected, ending the detection; and if the PDCCH is detected, further detecting a physical downlink shared channel (PDSCH) indicated by the PDCCH, and ending the detection when the detected PDSCH is not a paging signal of a current UE, otherwise, the detected PDSCH being the paging signal of a current user.

A UE in an RRC idle state periodically detects a paging signal, and the probability of receiving a paging signal belonging to the UE is relatively low, while the power consumption when each time a terminal detects PDCCH and PDSCH is high, which is not conducive for a terminal to save power.

In addition, a basic mechanism of Discontinuous Reception (DRX) is to configure a DRX cycle for a UE in an RRC connected state. The DRX cycle includes an active period (On Duration) and a sleep period (Opportunity for DRX), where during the active period, the UE monitors and receives the PDCCH, and during the sleep period, the UE does not receive data from a downlink channel to save power.

In most cases, when a UE is scheduled in a certain subframe to receive or transmit data, the UE may probably be scheduled persistently in next few subframes, and if it is needed to wait to receive or transmit the data until the next DRX cycle comes, additional delay may be caused. To shorten this type of delay, the UE may be in an active period persistently after being scheduled, that is, the UE may persistently monitor the PDCCH during a configured active period. In fact, a current mechanism is that each time when the UE is scheduled for initial data transmission, a timer drx-InactivityTimer may be started (or restarted), and the UE will stay in an active state until the timer expires. The drx-InactivityTimer specifies the number of consecutive PDCCH subframe(s) in an active state after the UE successfully decodes a PDCCH indicating an initial uplink UL or downlink DL user data transmission. That is, the timer is restarted once each time when the UE is scheduled for initial data transmission.

In order to further reduce the power consumption of blind detection of a paging signal or a PDCCH, the concepts of wake-up signal (WUS) and go-to-sleep signal are proposed.

In each DRX cycle of an idle state or an RRC connected state, before a UE blindly detects the Paging signal or the PDCCH, a base station transmits a wake-up signal to the UE, and the UE wakes up at a corresponding time, and detects the wake-up signal. If the UE detects the wake-up signal, the UE blindly detects the Paging signal or the PDCCH; otherwise, the UE does not blindly detect the Paging signal or the PDCCH (i.e., continuing to sleep).

The detecting the wake-up signal is less complex and more power-saving than blindly detecting the Paging signal or the PDCCH.

In each DRX cycle of an idle state or an RRC connected state, before a UE blindly detects the Paging signal or the PDCCH, a base station transmits a go-to-sleep signal to the UE, and the UE wakes up at a corresponding time, and detects the go-to-sleep signal. If the UE detects the go-to-sleep signal, the UE does not blindly detect the Paging signal or the PDCCH (i.e., continuing to sleep); otherwise, the UE blindly detects the Paging signal or the PDCCH (i.e., waking up).

The detecting the go-to-sleep signal is less complex and more power-saving than blindly detecting the Paging signal or the PDCCH.

However, in a design of a wake-up signal or a go-to-sleep signal through a sequence, generally, one sequence is only used to indicate one UE to enter a wake-up state or a sleep state, thereby resulting in a low resource utilization.

SUMMARY

The present disclosure provides a terminal state indicating method, which is applied to a base station. The method includes: transmitting a subsequence in a predetermined subsequence set, where the predetermined subsequence set includes at least one subsequence, each of the at least one subsequence is configured to indicate that at least two terminals are in a target state, and the target state includes a wake-up state or a sleep state.

An embodiment of the present disclosure further provides a terminal state determining method, which is applied to a terminal and includes:

receiving a subsequence transmitted by a base station;

detecting whether a target subsequence matching the currently received subsequence exists in a target subsequence set corresponding to configuration information indicated by the base station, where the target subsequence set is a subset of a predetermined subsequence set, the predetermined subsequence set includes at least one subsequence, each of the at least one subsequence is configured to indicate that at least two terminals are in a target state, and the target state includes a wake-up state or a sleep state; and determining a current state of the terminal according to the target state indicated by the target subsequence, in a case that the target subsequence matching the currently received subsequence exists in the target subsequence set.

An embodiment of the present disclosure further provides a base station, which includes: a transmission module, configured to transmit a subsequence in a predetermined subsequence set, where the predetermined subsequence set includes at least one subsequence, each of the at least one subsequence is configured to indicate that at least two terminals are in a target state, and the target state includes a wake-up state or a sleep state.

An embodiment of the present disclosure further provides a base station, which includes: a memory, a processor, and a terminal state indicating program that is stored on the memory and executable by the processor. When executing the terminal state indicating program, the processor is configured to implement steps of the terminal state indicating method as described above.

An embodiment of the present disclosure further provides a computer-readable storage medium. The computer-readable storage medium stores a terminal state indicating program, and the terminal state indicating program is executed by a processor to implement steps of the terminal state indicating method as described above.

An embodiment of the present disclosure further provides a terminal, which includes:

a receipt module, configured to receive a subsequence transmitted by a base station;

a detection module, configured to detect whether a target subsequence matching the currently received subsequence exists in a target subsequence set corresponding to configuration information indicated by the base station, where the target subsequence set is a subset of a predetermined subsequence set, the predetermined subsequence set includes at least one subsequence, each of the at least one subsequence is configured to indicate that at least two terminals are in a target state, and the target state includes a wake-up state or a sleep state; and a determination module, configured to determine a current state of the terminal according to the target state indicated by the target subsequence, in a case that the target subsequence matching the currently received subsequence exists in the target subsequence set.

An embodiment of the present disclosure further provides a terminal, which includes a memory, a processor, and a terminal state determining program that is stored on the memory and executable by the processor. The terminal state determining program is executed by the processor to implement steps of the terminal state determining method as described above.

An embodiment of the present disclosure further provides a computer-readable storage medium. The computer-readable storage medium stores a terminal state determining program, and the terminal state determining program is executed by the processor to implement steps of the terminal state determining method as described above.

BRIEF DESCRIPTION OF THE DRAWINGS

In order to illustrate technical solutions of embodiments of the present disclosure more clearly, drawings used in the description of the embodiments of the present disclosure are briefly described below. Obviously, the drawings in the following description are only some embodiments of the present disclosure, and for a person of ordinary skill in the art, other drawings can be obtained based on these drawings without creative efforts.

DETAILED DESCRIPTION

Technical solutions in embodiments of the present disclosure will be clearly and completely described below with reference to the drawings in the embodiments of the present disclosure. Obviously, the described embodiments are only a part of the embodiments of the present disclosure, but not all of the embodiments. All other embodiments obtained by a person of ordinary skill in the art based on the embodiments in the present disclosure and without creative efforts shall fall within the protection scope of the present disclosure.

Figure 1:
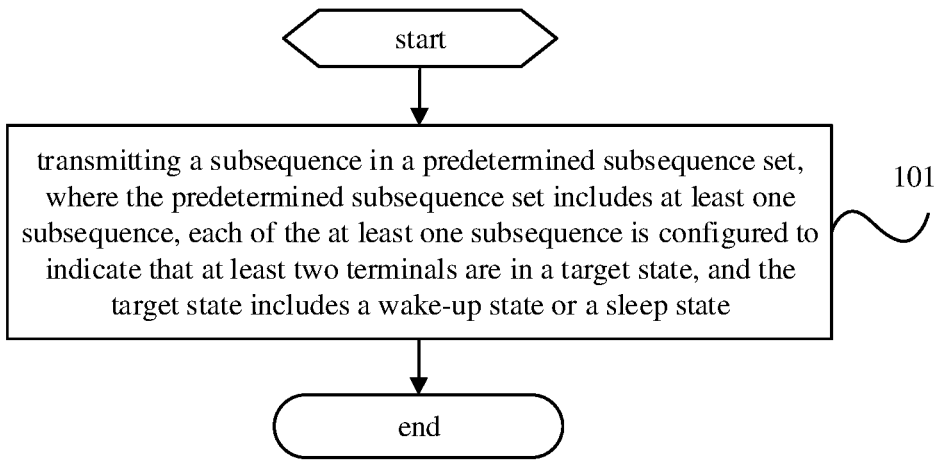
FIG. 1 is a flowchart of a terminal state indicating method according to an embodiment of the present disclosure.

FIG. 1 is a flowchart of a terminal state indicating method according to an embodiment of the present disclosure. As shown in FIG. 1, the method includes step 101: transmitting a subsequence in a predetermined subsequence set, where the predetermined subsequence set includes at least one subsequence, each of the at least one subsequence is configured to indicate that at least two terminals are in a target state, and the target state includes a wake-up state or a sleep state.

The predetermined subsequence set herein is a collection of subsequences pre-stored in the terminal and the base station, and indexes of every subsequences in the subsequence set are stored in both the terminal and the base station, thus the terminal can know a corresponding subsequence according to an index of the subsequence indicated by the base station.

At least one subsequence in the predetermined subsequence set is a root sequence of a predetermined sequence, or is obtained by a predetermined sequence subjected to different cyclic shifts. Specifically, the predetermined sequence may be at least one of a ZC sequence or an M sequence. Of course, the predetermined sequence may also be other sequences, such as a gold sequence. The ZC sequence is an abbreviation of ZadeOff-chu sequence.

In a case that the above predetermined sequence is a ZC sequence, specifically, whether each of at least two terminals is in a wake-up state or a sleep state is indicated through different root sequences.

In a case that the above predetermined sequence is an M sequence, specifically, whether each of at least two terminals is in a wake-up state or a sleep state is indicated through different cyclic shifts.

In the terminal state determining method according to the embodiment of the present disclosure, a subsequence in a predetermined subsequence set is transmitted, the predetermined subsequence set includes at least one subsequence, each subsequence is configured to indicate that at least two terminals are in a target state, and the target state includes a wake-up state or a sleep state. The embodiment of the present disclosure can indicate that at least two terminals are respectively in a wake-up state or a sleep state simultaneously through one subsequence, thereby improving resource utilization.

Further, prior to step 101, the method further includes indicating, to each terminal of the at least two terminals, configuration information corresponding to a target subsequence set in an implicit manner or in an explicit manner. The target subsequence set is a subset or a full set of the predetermined subsequence set, the target subsequence set includes at least one subsequence, and target subsequence sets indicated to the at least two terminals are different sequence sets or a same sequence set. The configuration information includes an index of each subsequence in the target subsequence set, a relationship between each subsequence and the target state, time-domain resource information of each subsequence and frequency-domain resource information of each subsequence.

Specifically, the time-domain resource information may be an orthogonal frequency division multiplexed OFDM symbol, a slot or a mini-slot.

The base station indicates configuration information corresponding to a target subsequence set to each terminal. When receiving a subsequence transmitted by the base station, the terminal detects whether a target subsequence matching the currently received subsequence exists in the target subsequence set corresponding to the configuration information indicated by the base station, and in a case that the target subsequence matching the currently received subsequence exists in the target subsequence set, the terminal determines a current state of the terminal according to the target state indicated by the target subsequence.

Optionally, at least two subsequences in the predetermined subsequence set are obtained from a same subsequence subjected to different phase offsets.

It is assumed that there are two subsequences having opposite phases in the predetermined subsequence set. In detecting whether the target subsequence matching the currently received subsequence exists in the target subsequence set corresponding to the configuration information indicated by the base station, the terminal may perform a predetermined matching operation between only one subsequence of the two subsequences and the currently received subsequence, such as an exclusive OR operation, to obtain a processing result, and obtains, according to the processing result, a result of the other subsequence about whether the other subsequence matches the currently received subsequence. Therefore, the number of times of performing the predetermined matching operation is reduced.

In a specific embodiment of the present disclosure, the base station may configure a subsequence only indicating that a terminal is in a wake-up state, or a subsequence only indicating that a terminal is in a sleep state, or may configure a subsequence separately indicating that a terminal is in a wake-up state and a terminal is in a sleep state. In this case, the relationship between the subsequence and the target state includes at least one of the following: a first relationship between the subsequence and a wake-up state, or a second relationship between the subsequence and a sleep state. In addition, subsequences configured by the base station for every terminals may be different, or subsequences configured by the base station for some terminals may be the same.

Further, the indicating, to each terminal of the at least two terminals, the configuration information corresponding to the target subsequence set in the explicit manner includes:

indicating, to each terminal of the at least two terminals, the configuration information corresponding to the target subsequence set through a predetermined message, where the predetermined message includes at least one of: system information, a radio resource control RRC signaling, a media access control layer control signaling, an L1 (Layer 1) control signal, or an L2 (Layer 2) control signal, and the predetermined message is transmitted to each of the at least two terminals in a broadcast, multicast, or unicast manner.

Further, the indicating, to each terminal of the at least two terminals, the configuration information corresponding to the target subsequence set in the implicit manner includes: indicating a relationship between the configuration information and a terminal identifier to each terminal of the at least two terminals based on an agreement of a technical specification.

The relationship between the configuration information and the terminal identifier is indicated to a terminal, so that the terminal obtains corresponding configuration information according to its own terminal identifier and the relationship.

Optionally, the configuration information is indicated to each terminal of the at least two terminals based on an agreement of a technical specification.

For example, subsequences in the predetermined subsequence set are transmitted on fixed resources based on an agreement of a technical specification. Specifically, the fixed resources include several sub-carriers in the center of the system bandwidth.

Optionally, a time-domain resource and/or a frequency-domain resource of a first subsequence in the predetermined subsequence set is different from a time-domain resource and/or a frequency-domain resource of a second subsequence in the predetermined subsequence set, the first subsequence is configured to indicate that at least two terminals within a coverage of a first cell are in the target state, the second subsequence is configured to indicate that at least two terminals within a coverage of a second cell are in the target state, and the first cell and the second cell are different cells.

Resources occupied by subsequences for different cells (inter-cells) are staggered, so as to avoid mutual interference and improve reliability of a sequence for waking a terminal up. In addition, when a sequence is detected, the sequence may be used for cell measurement at the same time, such as reference signal reception quality RSRQ and the received signal strength indication RSSI measurements, thereby making the RSRQ and RSSI measurements more accurate.

Optionally, a time-frequency resource of a third subsequence in the predetermined subsequence set is reserved as empty in a fourth cell, and a time-frequency resource of a fourth subsequence in the predetermined subsequence set is reserved as empty in a third cell, the third subsequence is configured to indicate that at least two terminals within a coverage of the third cell are in the target state, the fourth subsequence is configured to indicate that at least two terminals within a coverage of the fourth cell are in the target state, and the third cell and the fourth cell are neighboring cells.

Resources occupied by sequences corresponding to adjacent cells may be orthogonal (taking three adjacent cells as an example, each cell does not transmit any signal on time-frequency resources where the other two cell sequences are located, that is, it is blank). The resources occupied by subsequences for inter-cells are staggered to avoid mutual interference and improve reliability of the subsequence for waking up the terminal.

Optionally, a downlink transmission power corresponding to a time-frequency resource of the subsequence is higher than a downlink transmission power corresponding to a predetermined resource, and the predetermined resource and the subsequence occupy a same time-domain resource and different frequency-domain resources.

The downlink transmission power of the predetermined resource is lower than the transmission power of the time-frequency resource of the subsequence, and may even be 0, which increases the transmission power of the subsequence, thereby improving reliability of the subsequence for waking the terminal up.

Optionally, M subsequences in the predetermined subsequence set are configured to indicate that N terminals are respectively in a wake-up state or in a sleep state, M is less than or equal to $2^N$, and M and N are positive integers.

Optionally, one subsequence of the predetermined subsequence set is a discontinuous transmission DTX message.

In the embodiments of the present disclosure, a combination of states of a plurality of different terminals may be indicated through a sequence, or a state combination of the terminals may be indicated through a DTX message, thereby achieving the objective of saving resources.

Implementations of the embodiments of the present disclosure are described below with reference to specific application scenarios.

First Application Scenario

One subsequence is used to indicate states of two UEs. In the first application scenario, there are four states of UE A and UE B, corresponding to four subsequences, which may be specifically represented by four root sequences of a 31-bit ZC sequence. It is assumed that indexes of the four root sequences are 0, 1, 2, and 3, respectively, where:

root sequence 0 is used to indicate that UE A is in a sleep state and UE B is in a sleep state;

root sequence 1 is used to indicate that UE A is in a sleep state and UE B is in a wake-up state;

root sequence 2 is used to indicate that UE A is in a wake-up state and UE B is in a sleep state; and root sequence 3 is used to indicate that UE A is in a wake-up state and UE B is in a wake-up state.

The base station may configure subsequences respectively indicating that UE A and UE B are in a wake-up state according to the above relationship between the root sequences and the UE states, for example, configuring subsequences 2 and 3 for UE A, and configuring subsequences 1 and 3 for UE B.

In a case that UE A detects any of root sequence 2 or root sequence 3, UE A enters into a wake-up state; otherwise, UE A remains in a sleep state. In a case that UE B detects any of root sequence 1 or root sequence 3, UE B enters into a wake-up state; otherwise, UE B remains in a sleep state.

Optionally, two subsequences of the four subsequences in the first application scenario have opposite phases. It is assumed that a phase of root sequence 2 is opposite to a phase of root sequence 3, a predetermined matching operation may be performed between any one subsequence of root sequence 2 and root sequence 3 and the currently received subsequence, and an index of the subsequence is determined based on positive or negative of the obtained correlation value. In such a manner, the number of correlated operations can be reduced.

Second Application Scenario

One subsequence is used to indicate states of two UEs. In the second application scenario, there are four states of UE A and UE B, which are represented by three root sequences of a 31-bit ZC sequence and DTX (transmitting nothing). It is assumed that indexes of the three root sequences are 0, 1, and 2, respectively, where:

DTX is used to indicate that UE A is in a sleep state and UE B is in a sleep state;

root sequence 0 is used to indicate that UE A is in a sleep state and UE B is in a wake-up state;

root sequence 1 is used to indicate that UE A is in a wake-up state and UE B is in a sleep state; and root sequence 2 is used to indicate that UE A is in a wake-up state and UE B is in a wake-up state.

The base station may configure subsequences respectively indicating that UE A and UE B are in a wake-up state according to the above relationship between the root sequences and the UE states or the above relationship between the DTX and the UE state, for example, configuring subsequences 1 and 2 for UE A, and configuring subsequences 0 and 2 for UE B.

In a case that UE A detects any of root sequence 1 and root sequence 2, UE A enters a wake-up state; otherwise, UE A remains in a sleep state. In a case that UE B detects any of root sequence 0 and root sequence 2, UE B enters a wake-up state; otherwise, UE B remains in a sleep state.

Third Application Scenario

One subsequence is used to indicate states of three UEs. In the third application scenario, there are eight states of UE A, UE B, and UE C, corresponding to eight subsequences. Specifically, the eight states may be represented by eight root sequences of a 62-bit ZC sequence. It is assumed that indexes of the eight root sequences are 0, 1, 2, 3, 4, 5, 6, and 7, respectively, where:

root sequence 0 is used to indicate that UE A is in a sleep state, UE B is in a sleep state, and UE C is in a sleep state;

root sequence 1 is used to indicate that UE A is in a sleep state, UE B is in a sleep state, and UE C is in a wake-up state;

root sequence 2 is used to indicate that UE A is in a sleep state, UE B is in a wake-up state, and UE C is in a sleep state;

root sequence 3 is used to indicate that UE A is in a sleep state, UE B is in a wake-up state, and UE C is in a wake-up state.

root sequence 4 is used to indicate that UE A is in a wake-up state, UE B is in a sleep state, and UE C is in a sleep state;

root sequence 5 is used to indicate that UE A is in a wake-up state, UE B is in a sleep state, and UE C is in a wake-up state;

root sequence 6 is used to indicate that UE A is in a wake-up state, UE B is in a wake-up state, and UE C is in a sleep state; and root sequence 7 is used to indicate that UE A is in a wake-up state, UE B is in a wake-up state, and UE C is in a wake-up state.

The base station may configure subsequences used to indicate that UE A and UE B are respectively in a wake-up state according to the above relationship between the root sequences and the UE states, for example, configuring subsequences 4, 5, 6, and 7 for UE A, configuring subsequences 2, 3, 6, and 7 for UE B, and configuring subsequences 1, 3, 5, and 7 for UE C.

In a case that UE A detects any of root sequences 4, 5, 6, and 7, UE A enters a wake-up state; otherwise, UE A continues to be in a sleep state. In a case that UE B detects any of root sequences 2, 3, 6, and 7, UE B is in a wake-up state; otherwise, UE B remains in a sleep state. In a case that UE C detects any of root sequences 1, 3, 5, and 7, UE C enters a wake-up state; otherwise, UE C remains in a wake-up state.

Fourth Application Scenario

In the fourth application scenario, eight states of UE A, UE B, and UE C are indicated by five root sequences of one sequence. Specifically, the eight states are represented by five root sequences of a 31-bit ZC sequence. It is assumed that indexes of the five root sequences are 0, 1, 2, 3, and 4, respectively, where:

root sequence 0 is used to indicate that UE A is in a sleep state, UE B is in a sleep state, and UE C is in a sleep state;

root sequence 1 is used to indicate that UE A is in a sleep state, UE B is in a sleep state, and UE C is in a wake-up state;

root sequence 2 is used to indicate that UE A is in a sleep state, UE B is in a wake-up state, and UE C is in a sleep state;

root sequence 3 is used to indicate that UE A is in a sleep state, UE B is in a wake-up state, and UE C is in a wake-up state; or root sequence 3 is used to indicate that UE A is in a wake-up state, UE B is in a sleep state, and UE C is in a wake-up state; or root sequence 3 is used to indicate that UE A is in a wake-up state, UE B is in a wake-up state, and UE C is in a sleep state; or root sequence 3 is used to indicate that UE A is in a wake-up state, UE B is in a wake-up state, and UE C is in a wake-up state; and root sequence 4 is used to indicate that UE A is in a wake-up state, UE B is in a sleep state, and UE C is in a sleep state.

The base station may configure subsequences respectively indicating that UE A, UE B and UE C are in a wake-up state according to the above relationship between the root sequences and the UE states, for example, configuring subsequences 3 and 4 for UE A, configuring subsequences 2 and 3 for UE B, and configuring subsequences 1 and 3 for UE C.

In a case that UE A detects root sequence 3 or 4, UE A enters a wake-up state; otherwise, UE A continues to be in a sleep state. In a case that UE B detects root sequence 2 or 3, UE B is in a wake-up state; otherwise, UE B remains in a sleep state. In a case that UE C detects root sequence 1 or 3, UE C enters a wake-up state; otherwise, UE C continues to be in a sleep state.

It should be noted that root sequence 3 indicates four UE state combinations (where at least two UEs of the three UEs are in a wake-up state), and any one of the three UEs enters a wake-up state upon receipt of root sequence 3.

Fifth Application Scenario

One subsequence is used to indicate states of three UEs. In the fifth application scenario, there are eight states of UE A, UE B, and UE C, which are specifically represented by three root sequences of a 31-bit ZC sequence and DTX. It is assumed that indexes of the three root sequences are 0, 1, and 2, respectively, where:

DTX is used to indicate that UE A is in a sleep state, UE B is in a sleep state, and UE C is in a sleep state, or used to indicate that UE A is in a wake-up state, UE B is in a sleep state, and UE C is in a sleep state;

root sequence 0 is used to indicate that UE A is in a sleep state, UE B is in a sleep state, and UE C is in a wake-up state;

root sequence 1 is used to indicate that UE A is in a sleep state, UE B is in a wake-up state, and UE C is in a sleep state; and root sequence 2 is used to indicate that UE A is in a sleep state, UE B is in a wake-up state, and UE C is in a wake-up state; or root sequence 2 is used to indicate that UE A is in a wake-up state, UE B is in a sleep state, and UE C is in a wake-up state; or root sequence 2 is used to indicate that UE A is in a wake-up state, UE B is in a wake-up state, and UE C is in a sleep state; or root sequence 2 is used to indicate that UE A is in a wake-up state, UE B is in a wake-up state, and UE C is in a wake-up state.

The base station may configure subsequences indicating that UE A and UE B are respectively in a wake-up state according to the above relationship between the root sequences and the UE states, for example, configuring subsequence 2 and DTX for UE A, configuring subsequences 1 and 2 for UE B, and configuring subsequences 0 and 2 for UE C.

In a case that UE A detects root sequence 2 or DTX, UE A enters a wake-up state; otherwise, UE A remains in a sleep state. In a case that UE B detects root sequence 1 or 2, UE B is enters a wake-up state; otherwise, UE B remains in a sleep state. In a case that UE C detects root sequence 0 or 2, UE C enters a wake-up state; otherwise, UE C remains in a sleep state.

It should be noted that root sequence 2 indicates four UE state combinations (where at least two UEs among the three UEs are in a wake-up state), and any one of the three UEs enters a wake-up state when receiving root sequence 2.

In addition, in an embodiment of the present disclosure, a subsequence may also be used to indicate that one UE is in a wake-up state or a sleep state. There are two states (sleep state and wake-up state) for a UE, corresponding to two subsequences. Phases of the two subsequences are exactly opposite, for example, subsequence 0: 11011011011011, and subsequence 1: 00100100100100, where subsequence 0 is used to indicate that the UE is in a sleep state, and subsequence 1 is used to indicate that the UE is in a wake-up state.

The UE performs a correlated operation on a received sequence through any one of the foregoing sequences, determines an index of the sequence based on positive or negative of the obtained correlation value, and then determines whether the UE is in a wake-up state or in a sleep state. As an example, the UE performs a correlated operation between the received sequence transmitted by a base station and sequence 0: 11011011011011; the UE enters a sleep state in a case that the obtained correlation value is greater than a certain positive threshold; or the UE enters a wake-up state in a case that the obtained correlation value is less than a certain negative threshold.

In the embodiments of the present disclosure, a plurality of UEs shares one sequence and resources of the sequence, which increases capacity of a wake-up WUS signal, and the number of multiplexed UEs in each sequence can be flexibly adjusted, thereby achieving a flexible compromise between capacity and robustness. Moreover, a plurality of UEs shares one sequence, and the sequence can monopolize a transmission power of a base station.

Figure 2:
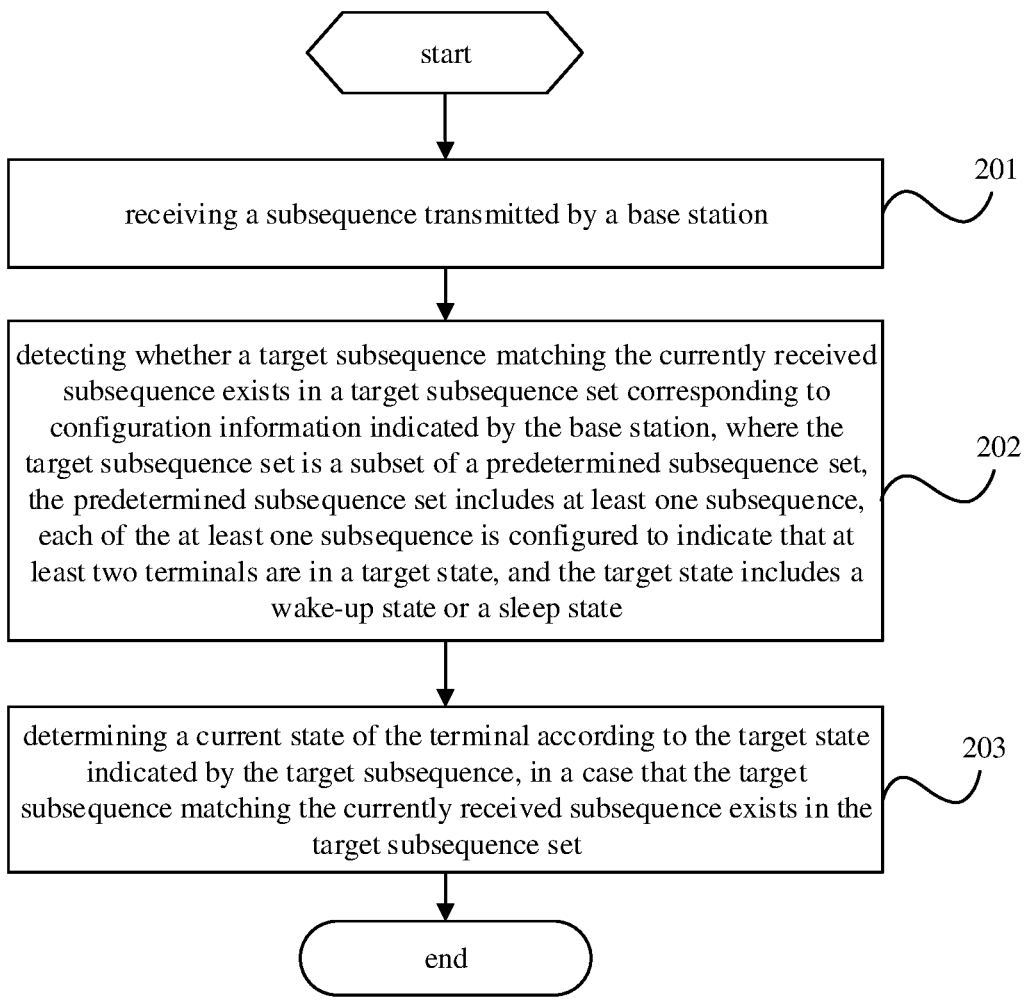
FIG. 2 is a flowchart of a terminal state determining method according to an embodiment of the present disclosure.

As shown in FIG. 2, an embodiment of the present disclosure further provides a terminal state determining method, which is applied to a terminal and includes steps 201 to 203.

Step 201: receiving a subsequence transmitted by a base station.

Step 202: detecting whether a target subsequence matching the currently received subsequence exists in a target subsequence set corresponding to configuration information indicated by the base station, where the target subsequence set is a subset of a predetermined subsequence set, the predetermined subsequence set includes at least one subsequence, each of the at least one subsequence is configured to indicate that at least two terminals are in a target state, and the target state includes a wake-up state or a sleep state.

Specifically, a predetermined matching operation is performed between subsequences in the target subsequence set and the currently received subsequence; and whether the target subsequence matching the currently received subsequence exists in the target subsequence set is detected according to a relationship between a processing result of the predetermined matching operation and a predetermined threshold.

The above predetermined matching operation may specifically include correlating two sequences.

As an optional implementation manner, the predetermined matching operation is performed sequentially on subsequences in the target subsequence set, with the currently received subsequence, until it is detected that a target subsequence matching the currently received subsequence exists in the target subsequence set.

For example, the terminal sequentially matches subsequences in the target subsequence set that are used to indicate the terminal being in a sleep state, with the currently received sequence (for example, performing a correlated operation on two sequences), to determine whether a subsequence configured to the terminal by the base station has been received. In a case that a detection result shows that the terminal has received a subsequence in the target subsequence set, the terminal stops a detection operation on the next sequence, and the UE enters into a sleep state; otherwise, the UE enters into a wake-up state.

As another optional implementation manner, the predetermined matching operation is performed respectively on each subsequence in the target subsequence set, with the currently received subsequence.

For example, the terminal matches the currently received sequence with all the subsequences indicating the terminal being in a sleep state that are in the target subsequence set, and there are two detection results:

in a case that a detection result shows that the UE has received a subsequence in the target subsequence set, the UE enters into a sleep state; and in a case that a detection result shows that the UE has not received any subsequence in the target subsequence set, the UE enters into a wake-up state.

For another example, a UE determines whether a subsequence in the target subsequence set configured by a base station for the UE has been received, by performing a correlated operation between all the subsequences in the target subsequence set and the currently received sequence. The UE determines whether to enter a sleep state or a wake-up state according to the received subsequence as determined by the UE. In a case that the received subsequence as determined by the UE is a subsequence indicating a sleep state, the UE enters a sleep state; in a case that the received subsequence as determined by the UE is a subsequence indicating a wake-up state, the UE enters a wake-up state; and in a case that the received subsequence as determined by the UE includes a subsequence indicating a wake-up state and a subsequence indicating a sleep state, the UE enters a wake-up state.

In the embodiments, the UE performs a correlated operation between one or more subsequences configured by the base station for the UE and the currently received sequence, to determine whether an index of a subsequence configured by the base station for the UE has been received, and then determines the target state (wake-up state or sleep state) of the UE.

Optionally, in a case that there are a first subsequence and a second subsequence with opposite phases in a subsequence group in the target subsequence set, the predetermined matching operation is performed between the first subsequence and the currently received subsequence to obtain a first processing result; and a second processing result of the second subsequence is obtained according to the first processing result, where the second processing result is a result whether the second subsequence matches the currently received subsequence.

In this embodiment, in a case that two subsequences with opposite phases exist in the target subsequence set, a predetermined matching operation only needs to be performed between one subsequence and the currently received subsequence, thereby reducing the number of times of performing the predetermined matching operation.

Step 203: determining a current state of the terminal according to the target state indicated by the target subsequence, in a case that the target subsequence matching the currently received subsequence exists in the target subsequence set.

In a case that there is a target subsequence matching the currently received subsequence in the target subsequence set, the target state corresponding to the target subsequence is obtained according to a relationship between the target subsequence and the target state in the above configuration information, and the current state of the terminal is determined as the target state.

The terminal state determining method according to the embodiments of the present disclosure includes: receiving a subsequence transmitted by a base station; detecting whether a target subsequence matching the currently received subsequence exists in a target subsequence set corresponding to configuration information indicated by the base station; and determining a current state of the terminal according to the target state indicated by the target subsequence, in a case that the target subsequence matching the currently received subsequence exists in the target subsequence set. In the embodiments of the present disclosure, the subsequence transmitted by the base station is configured to indicate that at least two terminals are in a target state, thereby improving utilization of resources.

Further, prior to the above step 202, the method further includes:

obtaining, in an implicit manner or in an explicit manner, the configuration information corresponding to the target subsequence set of the terminal indicated by the base station, where the configuration information includes an index of each subsequence in the target subsequence set, a relationship between the subsequence and the target state, time-domain resource information of the subsequence and frequency-domain resource information of the subsequence.

The terminal can receive a target subsequence set configured by a base station for the terminal, by obtaining configuration information, and determine a current state of the terminal according to a state indicated by the subsequence in the target subsequence set.

Further, the obtaining, in the explicit manner, the configuration information corresponding to the target subsequence set of the terminal indicated by the base station includes: obtaining, through a predetermined message transmitted by the base station, the configuration information corresponding to the target subsequence set of the terminal indicated by the base station. The predetermined message includes at least one of the following: system information, a radio resource control RRC signaling, a media access control layer (MAC) control signaling, an L1 control signal, or an L2 control signal, and the predetermined message is transmitted by the base station in a broadcast, multicast, or unicast manner.

Further, the obtaining, in the implicit manner, the configuration information corresponding to the target subsequence set of the terminal indicated by the base station includes: obtaining, based on an agreement of a technical specification, the configuration information corresponding to the target subsequence set of the terminal indicated by the base station.

The relationship between configuration information and a terminal identifiers is indicated to the terminal through the agreement of a technical specification, so that the terminal obtains corresponding configuration information according to its own terminal identifier and the relationship.

Optionally, a relationship between the configuration information indicated by the base station and terminal identifiers is obtained based on an agreement of a technical specification, and the configuration information indicated by the base station is obtained based on the relationship.

For example, a subsequence in the predetermined subsequence set is transmitted on a fixed resource based on an agreement of a technical specification. Specifically, the fixed resource includes several sub-carriers in the center of the system bandwidth.

According to an embodiment of the present disclosure, the terminal state determining method further includes: performing at least one of a synchronization or a cell measurement according to the target subsequence, in a case that the target subsequence matching the currently received subsequence exists in the target subsequence set.

According to the embodiments of the present disclosure, the terminal state determining method includes: receiving a subsequence transmitted by a base station; detecting whether a target subsequence matching the currently received subsequence exists in a target subsequence set corresponding to configuration information indicated by the base station; and determining a current state of the terminal according to the target state indicated by the target subsequence, in a case that the target subsequence matching the currently received subsequence exists in the target subsequence set. In the embodiments of the present disclosure, the subsequence transmitted by the base station is configured to indicate that at least two terminals are in a target state, thereby improving utilization of resources.

Figure 3:
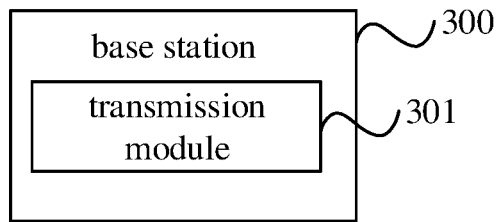
FIG. 3 is a first schematic modular diagram of a base station according to an embodiment of the present disclosure.

As shown in FIG. 3, a base station 300 is further provided according to an embodiment of the present disclosure, which includes: a transmission module 301 configured to transmit a subsequence in a predetermined subsequence set, where the predetermined subsequence set includes at least one subsequence, each of the at least one subsequence is configured to indicate that at least two terminals are in a target state, and the target state includes a wake-up state or a sleep state.

Figure 4:
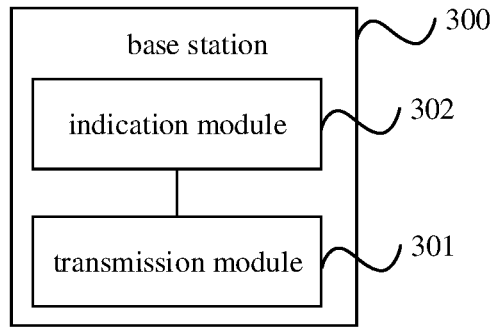
FIG. 4 is a second schematic modular diagram of a base station according to an embodiment of the present disclosure.

According to an embodiment of the present disclosure, as shown in FIG. 4, the base station further includes: an indication module 302, configured to indicate, to each terminal of the at least two terminals, configuration information corresponding to a target subsequence set in an implicit manner or in an explicit manner, where the target subsequence set is a subset or a full set of the predetermined subsequence set, the target subsequence set includes at least one subsequence, and target subsequence sets indicated for the at least two terminals are different sequence sets or a same sequence set. The configuration information includes an index of each subsequence in the target subsequence set, a relationship between the subsequence and the target state, time-domain resource information of the subsequence and frequency-domain resource information of the subsequence.

In the base station according to an embodiment of the present disclosure, the relationship between the subsequence and the target state includes at least one of: a first relationship between the subsequence and the wake-up state, or a second relationship between the subsequence and a sleep state.

In the base station according to an embodiment of the present disclosure, the indication module 302 is configured to indicate, to each terminal of the at least two terminals, the configuration information corresponding to the target subsequence set through a predetermined message. The predetermined message includes at least one of: system information, a radio resource control RRC signaling, a media access control layer control signaling, an L1 control signal, or an L2 control signal. The predetermined message is transmitted to each terminal in a broadcast, multicast, or unicast manner.

In the base station according to an embodiment of the present disclosure, the indication module 302 is configured to indicate a relationship between the configuration information and a terminal identifier to each terminal of the at least two terminals based on an agreement of a technical specification; or indicate the configuration information to each terminal of the at least two terminals based on an agreement of a technical specification.

In the base station according to an embodiment of the present disclosure, a time-domain resource and/or a frequency-domain resource of a first subsequence in the predetermined subsequence set is different from a time-domain resource and/or a frequency-domain resource of a second subsequence in the predetermined subsequence set, the first subsequence is configured to indicate that at least two terminals within a coverage of a first cell are in the target state, the second subsequence is configured to indicate that at least two terminals within a coverage of a second cell are in the target state, and the first cell and the second cell are different cells.

In the base station according to an embodiment of the present disclosure, a time-frequency resource of a third subsequence in the predetermined subsequence set is blank in a fourth cell, and a time-frequency resource of a fourth subsequence in the predetermined subsequence set is blank in a third cell, the third subsequence is configured to indicate that at least two terminals within a coverage of the third cell are in the target state, the fourth subsequence is configured to indicate that at least two terminals within a coverage of the fourth cell are in the target state, and the third cell and the fourth cell are neighboring cells.

In the base station according to an embodiment of the present disclosure, a downlink transmission power corresponding to a time-frequency resource of the subsequence is higher than a downlink transmission power corresponding to a predetermined resource, and the predetermined resource and the subsequence occupy a same time-domain resource and different frequency-domain resources.

In the base station according to an embodiment of the present disclosure, M subsequences in the predetermined subsequence set are configured to indicate that N terminals are respectively in a wake-up state or in a sleep state, M is less than or equal to $2^N$, and M and N are positive integers.

In the base station according to an embodiment of the present disclosure, at least one subsequence in the predetermined subsequence set is a root sequence of a predetermined sequence, or is obtained from a predetermined sequence subjected to different cyclic shifts.

In the base station according to an embodiment of the present disclosure, at least two subsequences in the predetermined subsequence set are obtained from one subsequence subjected to different phase shifts.

In the base station according to an embodiment of the present disclosure, a subsequence of the predetermined subsequence set is a discontinuous transmission DTX message.

The base station in the embodiments of the present disclosure transmits a subsequence in a predetermined subsequence set, where the predetermined subsequence set includes at least one subsequence, each of the at least one subsequence is configured to indicate that at least two terminals are in a target state, and the target state includes a wake-up state or a sleep state. The embodiments of the present disclosure can indicate that at least two terminals are respectively in a wake-up state or a sleep state simultaneously through one subsequence, thereby improving resource utilization.

An embodiment of the present disclosure further provides a base station, which includes: a memory, a processor, and a terminal state indicating program that is stored in the memory and executable by the processor. When executing the terminal state indicating program, the processor is configured to implement various processes in the above embodiments of the terminal state indicating method, and the same technical effects can be achieved, which are not described herein again, to avoid repetition.

An embodiment of the present disclosure further provides a computer-readable storage medium. The computer-readable storage medium stores a terminal state indicating program, the terminal state indicating program is implemented by a processor to implement various processes in the above embodiments of the terminal state indicating method, and the same technical effects can be achieved, which are not described herein again, to avoid repetition. The computer-readable storage medium includes, for example, a read-only memory (ROM), a random access memory (RAM), a magnetic disk or an optical disk.

Figure 5:
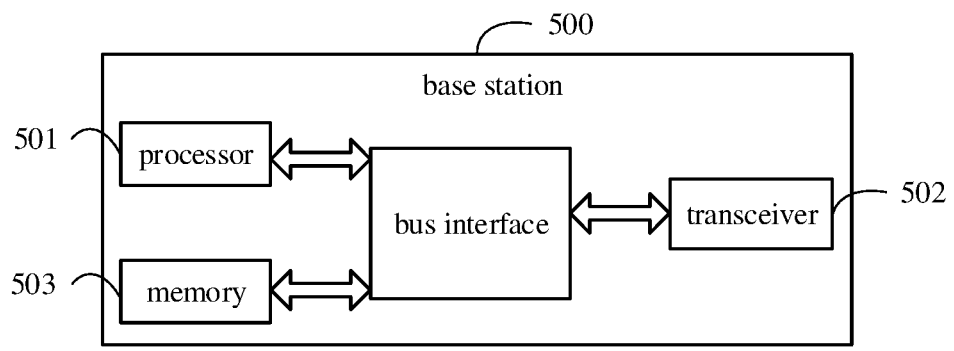
FIG. 5 is a block diagram of a base station according to an embodiment of the present disclosure.

As shown in FIG. 5, an embodiment of the present disclosure further provides a base station 500, which includes a processor 501, a transceiver 502, a memory 503, and a bus interface. The processor 501 is configured to read a program from the memory 503 and execute the following processes:

transmitting, by the transceiver 502, a subsequence in a predetermined subsequence set, where the predetermined subsequence set includes at least one subsequence, each of which is configured to indicate that at least two terminals are in a target state, and the target state includes a wake-up state or a sleep state.

In FIG. 5, the bus architecture may include any number of interconnected buses and bridges, and is configured to link various circuits including one or more processors specifically represented by the processor 501 and the memory specifically represented by the memory 503. The bus architecture can also link various other circuits together such as a peripheral, a voltage regulator, and a power management circuit, which are well known in the art, and thus are not further described herein. A bus interface provides an interface. The transceiver 502 may be multiple elements, including a transmitter and a receiver, providing a unit for communicating with various other devices over a transmission medium.

The processor 501 is responsible for managing the bus architecture and general processing, and the memory 503 may store data used by the processor 501 when performing operations.

Optionally, when reading a program from the memory 503, the processor 501 is further configured to perform the following steps:

indicating, to each terminal of the at least two terminals, configuration information corresponding to a target subsequence set in an implicit manner or in an explicit manner, where the target subsequence set is a subset or a full set of the predetermined subsequence set, the target subsequence set includes at least one subsequence, and target subsequence sets indicated for the at least two terminals are different sequence sets or a same sequence set; and where the configuration information includes an index of each subsequence in the target subsequence set, a relationship between the subsequence and the target state, time-domain resource information of the subsequence and frequency-domain resource information of the subsequence.

Optionally, the relationship between the subsequence and the target state includes at least one of: a first relationship between the subsequence and the wake-up state, or a second relationship between the subsequence and a sleep state.

Optionally, when reading a program from the memory 503, the processor 501 is further configured to perform the following steps:

indicating, to each terminal of the at least two terminals, the configuration information corresponding to the target subsequence set through a predetermined message, where the predetermined message includes at least one of: system information, a radio resource control RRC signaling, a media access control layer control signaling, an L1 control signal, or an L2 control signal, and the predetermined message is transmitted to each terminal in a broadcast, multicast, or unicast manner.

Optionally, when reading a program from the memory 503, the processor 501 is further configured to perform the following steps:

indicating a relationship between the configuration information and a terminal identifier to each terminal of the at least two terminals based on an agreement of a technical specification; or indicating the configuration information to each terminal of the at least two terminals based on an agreement of a technical specification.

Optionally, a time-domain resource and/or a frequency-domain resource of a first subsequence in the predetermined subsequence set is different from a time-domain resource and/or a frequency-domain resource of a second subsequence in the predetermined subsequence set, the first subsequence is configured to indicate that at least two terminals within a coverage of a first cell are in the target state, the second subsequence is configured to indicate that at least two terminals within a coverage of a second cell are in the target state, and the first cell and the second cell are different cells.

Optionally, a time-frequency resource of a third subsequence in the predetermined subsequence set is blank in a fourth cell, and a time-frequency resource of a fourth subsequence in the predetermined subsequence set is blank in a third cell, the third subsequence is configured to indicate that at least two terminals within a coverage of the third cell are in the target state, the fourth subsequence is configured to indicate that at least two terminals within a coverage of the fourth cell are in the target state, and the third cell and the fourth cell are neighboring cells.

Optionally, a downlink transmission power corresponding to a time-frequency resource of the subsequence is higher than a downlink transmission power corresponding to a predetermined resource, and the predetermined resource and the subsequence occupy a same time-domain resource and different frequency-domain resources.

Optionally, M subsequences in the predetermined subsequence set are configured to indicate that N terminals are respectively in a wake-up state or in a sleep state, M is less than or equal to $2^N$, and M and N are positive integers.

Optionally, at least one subsequence in the predetermined subsequence set is a root sequence of a predetermined sequence, or is obtained from a predetermined sequence subjected to different cyclic shifts.

Optionally, at least two subsequences in the predetermined subsequence set are obtained from one subsequence subjected to different phase shifts.

Optionally, a subsequence of the predetermined subsequence set is a discontinuous transmission DTX message.

The base station in the embodiments of the present disclosure transmits a subsequence in a predetermined subsequence set, where the predetermined subsequence set includes at least one subsequence, each of which is configured to indicate that at least two terminals are in a target state, and the target state includes a wake-up state or a sleep state. The embodiments of the present disclosure can simultaneously indicate that at least two terminals are respectively in a wake-up state or a sleep state through one subsequence, thereby improving resource utilization.

Figure 6:
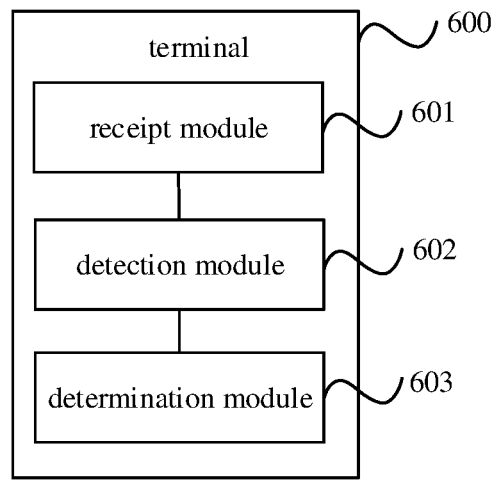
FIG. 6 is a first schematic modular diagram of a terminal according to an embodiment of the present disclosure.

An embodiment of the present disclosure further provides a terminal 600. As shown in FIG. 6, the terminal includes:

a receipt module 601, configured to receive a subsequence transmitted by a base station;

a detection module 602, configured to detect whether a target subsequence matching the currently received subsequence exists in a target subsequence set corresponding to configuration information indicated by the base station, where the target subsequence set is a subset of a predetermined subsequence set, the predetermined subsequence set includes at least one subsequence, each of the at least one subsequence is configured to indicate that at least two terminals are in a target state, and the target state includes a wake-up state or a sleep state; and a determination module 603, configured to determine a current state of the terminal according to the target state indicated by the target subsequence, in a case that the target subsequence matching the currently received subsequence exists in the target subsequence set.

Figure 7:
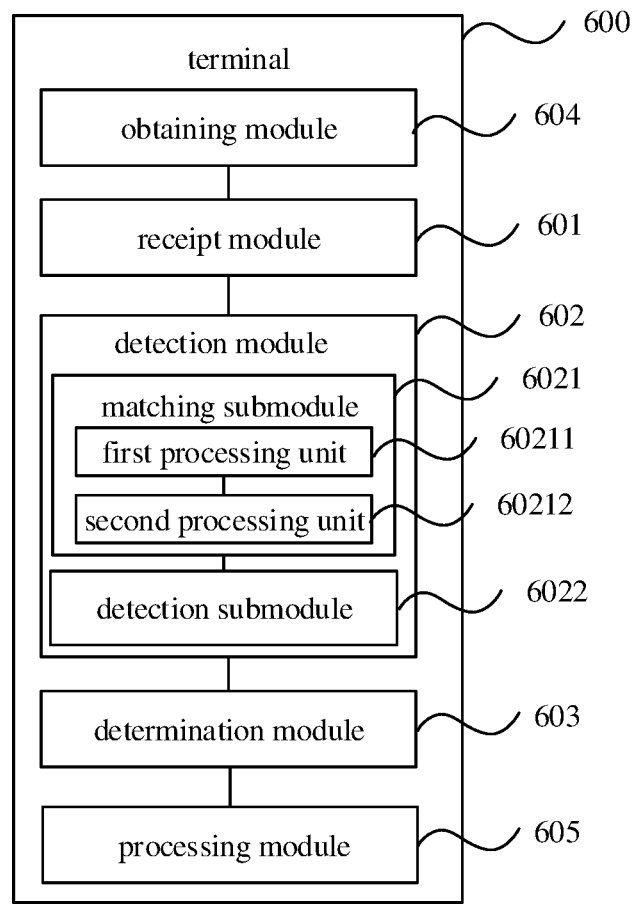
FIG. 7 is a second schematic modular diagram of a terminal according to an embodiment of the present disclosure.

As shown in FIG. 7, the terminal according to an embodiment of the present disclosure further includes: an obtaining module 604, configured to obtain the configuration information corresponding to the target subsequence set of the terminal indicated by the base station in an implicit manner or in an explicit manner. The configuration information includes an index of each subsequence in the target subsequence set, a relationship between the subsequence and the target state, time-domain resource information of the subsequence and frequency-domain resource information of the subsequence.

In the terminal according to an embodiment of the present disclosure, the obtaining module 604 is configured to obtain, through a predetermined message transmitted by the base station, the configuration information corresponding to the target subsequence set of the terminal indicated by the base station. The predetermined message includes at least one of: system information, a radio resource control RRC signaling, a media access control layer control signaling, an L1 control signal, or an L2 control signal, and the predetermined message is transmitted by the base station in a broadcast, multicast, or unicast manner.

In the terminal according to an embodiment of the present disclosure, the obtaining module 604 is configured to obtain, based on an agreement of a technical specification, the configuration information corresponding to the target subsequence set of the terminal indicated by the base station, or obtain, based on an agreement of a technical specification, a relationship between the configuration information indicated by the base station and a terminal identifier, and obtain, based on the relationship, the configuration information indicated by the base station.

In the terminal according to an embodiment of the present disclosure, the detection module 602 includes: a matching submodule 6021, configured to perform a predetermined matching operation between subsequences in the target subsequence set and the currently received subsequence; and a detection submodule 6022, configured to detect whether the target subsequence matching the currently received subsequence exists in the target subsequence set according to a relationship between a processing result of the predetermined matching operation and a predetermined threshold.

In the terminal according to an embodiment of the present disclosure, the matching submodule 6021 is configured to perform the predetermined matching operation sequentially between subsequences in the target subsequence set and the currently received subsequence, until it is detected that a target subsequence matching the currently received subsequence exists in the target subsequence set; or perform the predetermined matching operation between all the subsequences in the target subsequence set and the currently received subsequence, respectively.

In the terminal according to an embodiment of the present disclosure, the matching submodule 6021 includes: a first processing unit 60211, configured to perform the predetermined matching operation between a first subsequence and the currently received subsequence to obtain a first processing result, in a case that the first subsequence and a second subsequence with opposite phases exist in a subsequence group in the target subsequence set; and a second processing unit 60212, configured to obtain, according to the first processing result, a second processing result of the second subsequence about whether the second subsequence matches the currently received subsequence.

The terminal in the embodiment of the present disclosure further includes: a processing module 605, configured to perform a synchronization and/or a cell measurement according to the target subsequence, in a case that a target subsequence matching the currently received subsequence exists in the target subsequence set.

It should be noted that the terminal is a terminal corresponding to the foregoing method embodiments, and all the implementation manners in the foregoing method embodiments applied to a terminal side are applicable to the embodiments of the terminal, and the same technical effects can also be achieved.

The terminal in the embodiments of the present disclosure receives a subsequence transmitted by a base station, detects whether a target subsequence matching the currently received subsequence exists in a target subsequence set corresponding to configuration information indicated by the base station, and determines a current state of the terminal according to the target state indicated by the target subsequence, in a case that the target subsequence matching the currently received subsequence exists in the target subsequence set. In the embodiments of the present disclosure, the subsequence transmitted by the base station is configured to indicate that at least two terminals are in a target state, thereby improving resource utilization.

An embodiment of the present disclosure further provides a terminal, including: a memory, a processor, and a terminal state determining program that is stored in the memory and executable by the processor. When executing the terminal state determining program, the processor is configured to implement various processes in the above embodiments about the terminal state determining method, and the same technical effects can be achieved, which are not described herein again, to avoid repetition.

An embodiment of the present disclosure further provides a computer-readable storage medium. The computer-readable storage medium stores a terminal state determining program, the terminal state determining program is implemented by a processor to implement various processes in the above embodiments about the terminal state determining method, and the same technical effects can be achieved, which are not described herein again to avoid repetition. The computer-readable storage medium includes, for example, a read-only memory (ROM), a random access memory (RAM), a magnetic disk or an optical disk.

Figure 8:
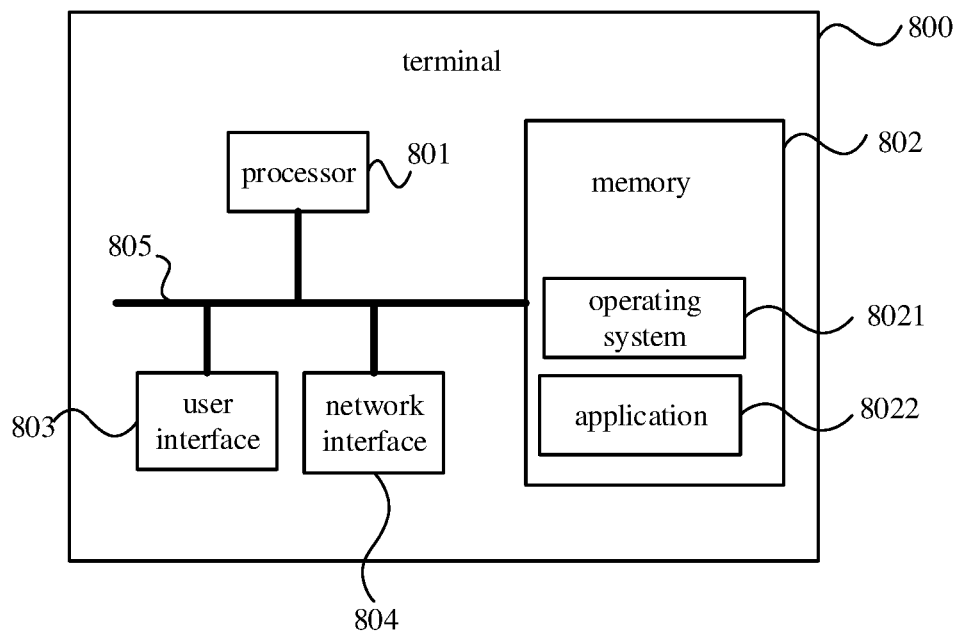
FIG. 8 is a structural block diagram of a terminal according to an embodiment of the present disclosure.

As shown in FIG. 8, an embodiment of the present disclosure further provides a terminal. The terminal 800 shown in FIG. 8 includes: at least one processor 801, a memory 802, at least one network interface 804, and other user interfaces 803. Various components in the terminal 800 are coupled together through a bus system 805. It can be understood that the bus system 805 is configured to implement connections and communications between these components. The bus system 805 includes a power bus, a control bus, and a status signal bus, in addition to a data bus. For the sake of clarity, various buses are all labeled as the bus system 805 in FIG. 8.

The user interface 803 may include a display, a keyboard, or a click device (for example, a mouse or a trackball), a touch pad, or a touch screen.

It is understood that the memory 802 in embodiments of the present disclosure may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 802 of the system and method described in the specification is meant to include, without limitation, these and any other suitable types of memories.

In some embodiments, the memory 802 stores the following elements: an executable module or a data structure, or a subset or extension set thereof, such as an operating system 8021 and an application 8022.

The operating system 8021 includes various system programs, such as a framework layer program, a core library layer program and a driver layer program, to implement various fundamental services and process hardware-based tasks. The application 8022 includes various applications, such as a media player and a browser, to implement a variety of application services. The program implementing the method according to embodiments of the present disclosure may be included in the application 8022.

In an embodiment of the present disclosure, the terminal 800 further includes a computer program that is stored on the memory 802 and executable by the processor 801, which may specifically be a terminal state determining program stored in the application 8022. The terminal state determining program is executed by the processor 801 to achieve the following steps:

receiving a subsequence transmitted by a base station;

detecting whether a target subsequence matching the currently received subsequence exists in a target subsequence set corresponding to configuration information indicated by the base station, where the target subsequence set is a subset of a predetermined subsequence set, the predetermined subsequence set includes at least one subsequence, each of the at least one subsequence is configured to indicate that at least two terminals are in a target state, and the target state includes a wake-up state or a sleep state; and determining a current state of the terminal according to the target state indicated by the target subsequence, in a case that the target subsequence matching the currently received subsequence exists in the target subsequence set.

Optionally, the terminal state determining program is executed by the processor 801 to obtain the configuration information corresponding to the target subsequence set of the terminal indicated by the base station in an implicit manner or in an explicit manner. The configuration information includes an index of each subsequence in the target subsequence set, a relationship between the subsequence and the target state, time-domain resource information of the subsequence and frequency-domain resource information of the subsequence.

Optionally, the terminal state determining program is executed by the processor 801 to obtain, through a predetermined message transmitted by the base station, the configuration information corresponding to the target subsequence set of the terminal indicated by the base station. The predetermined message includes at least one of: system information, a radio resource control RRC signaling, a media access control layer control signaling, an L1 control signal, or an L2 control signal, and the predetermined message is transmitted by the base station in a broadcast, multicast, or unicast manner.

Optionally, the terminal state determining program is executed by the processor 801 to obtain, based on an agreement of a technical specification, the configuration information corresponding to the target subsequence set of the terminal indicated by the base station; or to obtain, based on an agreement of a technical specification, a relationship between the configuration information indicated by the base station and a terminal identifier, and obtain, based on the relationship, the configuration information indicated by the base station.

Optionally, the terminal state determining program is executed by the processor 801 to implement the following steps:

performing a predetermined matching operation between subsequences in the target subsequence set and the currently received subsequence; and detecting whether the target subsequence matching the currently received subsequence exists in the target subsequence set according to a relationship between a processing result of the predetermined matching operation and a predetermined threshold.

Optionally, the terminal state determining program is executed by the processor 801 to implement the following steps:

performing the predetermined matching operation sequentially between subsequences in the target subsequence set and the currently received subsequence, until it is detected that a target subsequence matching the currently received subsequence exists in the target subsequence set; or performing the predetermined matching operation between each subsequence in the target subsequence set and the currently received subsequence.

Optionally, the terminal state determining program is executed by the processor 801 to implement the following steps:

performing the predetermined matching operation between a first subsequence and the currently received subsequence to obtain a first processing result, in a case that the first subsequence and a second subsequence with opposite phases exist in a subsequence group in the target subsequence set; and obtaining, according to the first processing result, a second processing result of the second subsequence about whether the second subsequence matches the currently received subsequence.

Optionally, the terminal state determining program is executed by the processor 801 to implement the following steps:

performing a synchronization and/or a cell measurement according to the target subsequence, in a case that the target subsequence matching the currently received subsequence exists in the target subsequence set.

In the terminal 800 in the embodiments of the present disclosure, the processor 801 is configured to receive a subsequence transmitted by a base station, detect whether a target subsequence matching the currently received subsequence exists in a target subsequence set corresponding to configuration information indicated by the base station, and determine a current state of the terminal according to the target state indicated by the target subsequence, in a case that the target subsequence matching the currently received subsequence exists in the target subsequence set. In the embodiments of the present disclosure, the subsequence transmitted by the base station is configured to indicate that at least two terminals are in a target state, thereby improving resource utilization.

The terminal of the present disclosure may be a terminal such as a mobile phone, a tablet computer, a personal digital assistant (PDA), or a vehicle-mounted computer.

The terminal 800 can implement various processes implemented by the terminal in the foregoing embodiments. To avoid repetition, details are not described herein again.

The method disclosed in the foregoing embodiments of the present disclosure may be applied to the processor 801 or implemented by the processor 801. The processor 801 may be an integrated circuit with signal processing capability. During an implementation process, various steps of the above methods may be realized in form of hardware by integrated logical circuits in the processor 801, or in form of software by instructions. The processor 801 may be a general purpose processor, a digital signal processor (DSP), an application specific integrated circuit (ASIC), a field programmable gate array (FPGA) or other programmable logic devices, a discrete gate or a transistor logic device, or a discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may reside in well-established storage medium in the art, such as RAM, flash memory, ROM, PROM or EEPROM, register, etc. The storage medium is in the memory 802. The processor 801 reads information from the memory 802 and performs the steps of the methods with its hardware.

Understandably, the embodiments described in the present disclosure may be implemented by hardware, software, firmware, middleware, microcode or a combination thereof. For hardware implementation, processing units may be implemented in one or more of: application specific integrated circuits (ASIC), digital signal processor (DSP), DSP device (DSPD), programmable logic device (PLD), field-programmable gate array (FPGA), general purpose processor, controller, microcontroller, microprocessor, other electronic unit configured to perform the function described in this application or a combination thereof.

For software implementation, the technical solutions described in the embodiments of the present disclosure may be implemented by a module (e.g., process, function, etc.) configured to perform the function described in the embodiments of the present disclosure. Software code may be stored in a storage and executed by the processor. The storage may be implemented internal or external to the processor.

Every embodiments in the specification are described in a progressive manner, each embodiment emphasizes differences from other embodiments and reference can be made to each other for the same or similar parts among the embodiments.

A person of ordinary skill in the art may appreciate that embodiments in the present disclosure can include a method, a device, or a computer program product. Accordingly, the embodiments of the present disclosure may be in a form of an entirely hardware embodiment, an entirely software embodiment, or a combination of software and hardware. Moreover, the embodiments of the present disclosure may take the form of a computer program product embodied in one or more computer usable available media (including, but not limited to, a disk storage, a CD-ROM (Compact Disc read-only-memory), and an optical storage), which includes computer usable program codes.

Embodiments of the present disclosure are illustrated with reference to a flowchart and/or a block diagram of the method, the terminal device (system), and the computer program product according to the embodiments of the present disclosure. It can be understood that each flow and/or each block of the flowchart and/or the block diagram and a combination thereof may be implemented by computer program instructions. These computer program instructions can be provided to a processor of a general-purpose computer, a special-purpose computer, an embedded processor or other programmable data processing terminal devices to produce a machine, such that instructions are executed by a processor of a computer or other programmable data processing terminal device to implement a device with functions specified in one or more flows in the flowcharts and/or one or more blocks in the block diagrams.

These computer program instructions can also be stored in a computer-readable memory that can instruct a computer or other programmable data processing terminal devices to operate in a specific manner, such that the instructions stored in the computer-readable memory produce an article including an instruction device, and the instruction device implements the functions specified in one or more flows in the flowcharts and/or one or more blocks in the block diagrams.

These computer program instructions can also be loaded into a computer or other programmable data processing terminal devices such that a series of operational steps are performed on the computer or other programmable terminal devices to produce computer-implemented processing. Therefore, the instructions are executed on the computer or other programmable data processing terminal devices to provide steps of the functions specified in one or more flows in the flowcharts and/or one or more blocks in the block diagrams.

Although optional embodiments have been described in the embodiments of the present disclosure, a person of ordinary skill in the art can make additional changes and modifications to the embodiments once they are aware of the basic inventive concepts. Therefore, the appended claims are intended to be interpreted as including all the optional embodiments and all the changes and modifications that fall within the scope of the embodiments of the present disclosure.

It should also be noted that, in this specification, relational terms such as first and second are used merely to distinguish one entity or operation from another entity or operation, without necessarily requiring or implying any such actual relationship or order between such entities or operations. Furthermore, the terms "include" or "comprise" or any other variations are intended to encompass a non-exclusive inclusion, such that a process, method, article, or terminal device that includes multiple elements includes not only those elements but also elements that are not listed, or includes elements inherent to such process, method, article, or terminal device. Without further limitations, an element preceded by the phrase "including a . . . " does not exclude the presence of additional identical elements in the process, method, article, or terminal device that includes the element.

The above descriptions are optional implementations of the present disclosure. It should be noted that, numerous modifications and improvements can be made by a person of ordinary skill in the art without departing from the principle of the present disclosure, and these modifications and improvements shall fall within the scope of the present disclosure.

What is claimed is:

1. A terminal state indicating method; applied to a base station, and comprising:
   transmitting a subsequence in a predetermined subsequence set; wherein the predetermined subsequence set comprises at least three subsequences, the at least three subsequences are configured to indicate that at least two terminals are in a target state, and the target state comprises a wake-up state or a sleep state, and
   wherein the at least three subsequences comprises: different subsequences respectively corresponding to the at least two terminals, and a same subsequence corresponding to the at least two terminals.

2. The terminal state indicating method according to claim 1, wherein before transmitting the subsequence in the predetermined subsequence set, the method further comprises:
   indicating, to each terminal of the at least two terminals, configuration information corresponding to a target subsequence set in an implicit manner or in an explicit manner, wherein the target subsequence set is a subset or a full set of the predetermined subsequence set, the target subsequence set comprises at least one subsequence, and target subsequence sets indicated for the at least two terminals are different sequence sets or a same sequence set; and
   wherein the configuration information comprises an index of each subsequence in the target subsequence set, a relationship between the subsequence and the target state, time-domain resource information of the subsequence and frequency-domain resource information of the subsequence.

3. The terminal state indicating method according to claim 2, wherein the relationship between the subsequence and the target state comprises at least one of:
   a first relationship between the subsequence and the wake-up state, or a second relationship between the subsequence and the sleep state.

4. The terminal state indicating method according to claim 2, wherein the indicating, to each terminal of the at least two terminals, the configuration information corresponding to the target subsequence set in the explicit manner comprises:
   indicating, to each terminal of the at least two terminals, the configuration information corresponding to the target subsequence set through a predetermined message, wherein the predetermined message comprises at least one of: system information, a radio resource control RRC signaling, a media access control layer control signaling, an L1 control signal, or an L2 control signal, and
   the predetermined message is transmitted to each terminal in a broadcast, multicast, or unicast manner.

5. The terminal state indicating method according to claim 2, wherein the indicating, to each terminal of the at least two terminals, the configuration information corresponding to the target subsequence set in the implicit manner comprises:
   indicating a relationship between the configuration information and a terminal identifier to each terminal of the at least two terminals based on an agreement of a technical specification; or
   indicating the configuration information to each terminal of the at least two terminals based on an agreement of a technical specification.

6. The terminal state indicating method according to claim 1, wherein a time-domain resource and/or a frequency-domain resource of a first subsequence in the predetermined subsequence set is different from a time-domain resource and/or a frequency-domain resource of a second subsequence in the predetermined subsequence set, the first subsequence is configured to indicate that at least two terminals within a coverage of a first cell are in the target state, the second subsequence is configured to indicate that at least two terminals within a coverage of a second cell are in the target state, and the first cell and the second cell are different cells; or
   wherein a time-frequency resource of a third subsequence in the predetermined subsequence set is blank in a fourth cell, and a time-frequency resource of a fourth subsequence in the predetermined subsequence set is blank in a third cell, the third subsequence is configured to indicate that at least two terminals within a coverage of the third cell are in the target state, the fourth subsequence is configured to indicate that at least two terminals within a coverage of the fourth cell are in the target state, and the third cell and the fourth cell are neighboring cells.

7. The terminal state indicating method according to claim 1, wherein a downlink transmission power corresponding to a time-frequency resource of the subsequence is higher than a downlink transmission power corresponding to a predetermined resource, and the predetermined resource and the subsequence occupy a same time-domain resource and different frequency-domain resources; or
   wherein M subsequences in the predetermined subsequence set are configured to indicate that N terminals are respectively in a wake-up state or in a sleep state, M is less than or equal to $2^N$, and M and N are positive integers.

8. The terminal state indicating method according to claim 1, wherein at least one subsequence in the predetermined subsequence set is a root sequence of a predetermined sequence, or is obtained from a predetermined sequence subjected to different cyclic shifts; or wherein at least two subsequences in the predetermined subsequence set are obtained from one subsequence subjected to different phase shifts; or wherein a subsequence of the predetermined subsequence set is a discontinuous transmission DTX message.

9. A terminal state determining method, applied to a terminal, and comprising:

receiving a subsequence transmitted by a base station;

detecting whether a target subsequence matching a currently received subsequence exists in a target subsequence set corresponding to configuration information indicated by the base station, wherein the target subsequence set is a subset of a predetermined subsequence set, the predetermined subsequence set comprises at least three subsequences, the at least three subsequences are configured to indicate that at least two terminals are in a target state, and the target state comprises a wake-up state or a sleep state, wherein the at least three subsequences comprises: different subsequences respectively corresponding to the at least two terminals, and a same subsequence corresponding to the at least two terminals; and determining a current state of the terminal according to the target state indicated by the target subsequence, in a case that the target subsequence matching the currently received subsequence exists in the target subsequence set.

10. The terminal state determining method according to claim 9, further comprising:

obtaining, in an implicit manner or in an explicit manner, the configuration information corresponding to the target subsequence set of the terminal indicated by the base station, wherein the configuration information includes an index of each subsequence in the target subsequence set, a relationship between the subsequence and the target state, time-domain resource information of the subsequence and frequency-domain resource information of the subsequence.

11. The terminal state determining method according to claim 10, wherein the obtaining, in the explicit manner, the configuration information corresponding to the target subsequence set of the terminal indicated by the base station comprises:

obtaining, through a predetermined message transmitted by the base station, the configuration information corresponding to the target subsequence set of the terminal indicated by the base station; wherein the predetermined message comprises at least one of: a system information, a radio resource control RRC signaling, a media access control layer control signaling, a Layer 1 (L1) control signal, or a Layer 2 (L2) control signal, and the predetermined message is transmitted by the base station in a broadcast, multicast, or unicast manner, or wherein the obtaining, in the implicit manner, the configuration information corresponding to the target subsequence set of the terminal indicated by the base station comprises:

obtaining, based on an agreement of a technical specification, the configuration information corresponding to the target subsequence set of the terminal indicated by the base station; or obtaining, based on an agreement of a technical specification, a relationship between the configuration information indicated by the base station and a terminal identifier, and obtaining, based on the relationship, the configuration information indicated by the base station.

12. The terminal state determining method according to claim 9, wherein the detecting whether the target subsequence matching the currently received subsequence exists in the target subsequence set corresponding to the configuration information indicated by the base station comprises:

performing a predetermined matching operation between subsequences in the target subsequence set and the currently received subsequence; and detecting whether the target subsequence matching the currently received subsequence exists in the target subsequence set according to a relationship between a processing result of the predetermined matching operation and a predetermined threshold.

13. The terminal state determining method according to claim 12, wherein the performing the predetermined matching operation between the subsequences in the target subsequence set and the currently received subsequence comprises:

performing the predetermined matching operation sequentially between subsequences in the target subsequence set and the currently received subsequence, until it is detected that a target subsequence matching the currently received subsequence exists in the target subsequence set; or performing the predetermined matching operation between each subsequence in the target subsequence set and the currently received subsequence, or wherein the performing the predetermined matching operation between the subsequences in the target subsequence set and the currently received subsequence comprises:

performing the predetermined matching operation between a first subsequence and the currently received subsequence to obtain a first processing result, in a case that the first subsequence and a second subsequence with opposite phases exist in a subsequence group in the target subsequence set; and obtaining, according to the first processing result, a second processing result of the second subsequence about whether the second subsequence matches the currently received subsequence.

14. The terminal state determining method according to claim 9, further comprising:

performing a synchronization and/or a cell measurement according to the target subsequence, in a case that the target subsequence matching the currently received subsequence exists in the target subsequence set.

15. A terminal, comprising a memory, a processor, and a program that is stored in the memory and is executable by the processor, wherein, when executing the program, the processor is configured to implement steps of the terminal state determining method according to claim 9.

16. A base station, comprising: a memory, a processor, and a program that is stored in the memory and is executable by the processor, wherein, when executing the program, the processor is configured to:

transmit a subsequence in a predetermined subsequence set, wherein the predetermined subsequence set comprises at least three subsequences, the at least three subsequences are configured to indicate that at least two terminals are in a target state, and the target state comprises a wake-up state or a sleep state, and wherein the at least three subsequences comprises: different subsequences respectively corresponding to the at least two terminals, and a same subsequence corresponding to the at least two terminals.

17. The base station according to claim 16, wherein the processor is further configured to:

indicate, to each terminal of the at least two terminals, configuration information corresponding to a target subsequence set in an implicit manner or in an explicit manner, wherein the target subsequence set is a subset or a full set of the predetermined subsequence set, the target subsequence set comprises at least one subsequence, and target subsequence sets indicated for the at least two terminals are different sequence sets or a same sequence set; and wherein the configuration information comprises an index of each subsequence in the target subsequence set, a relationship between the subsequence and the target state, time-domain resource information of the subsequence and frequency-domain resource information of the subsequence.

18. The base station according to claim 17, wherein the relationship between the subsequence and the target state comprises at least one of: a first relationship between the subsequence and the wake-up state, or a second relationship between the subsequence and the sleep state; or wherein the processor is further configured to indicate, to each terminal of the at least two terminals, the configuration information corresponding to the target subsequence set through a predetermined message, the predetermined message comprises at least one of: system information, a radio resource control RRC signaling, a media access control layer control signaling, an L1 control signal, or an L2 control signal, and the predetermined message is transmitted to each terminal in a broadcast, multicast, or unicast manner; or wherein the processor is further configured to:

indicate a relationship between the configuration information and a terminal identifier to each terminal of the at least two terminals based on an agreement of a technical specification; or indicate the configuration information to each terminal of the at least two terminals based on an agreement of a technical specification.

19. The base station according to claim 16, wherein a time-domain resource and/or a frequency-domain resource of a first subsequence in the predetermined subsequence set is different from a time-domain resource and/or a frequency-domain resource of a second subsequence in the predetermined subsequence set, the first subsequence is configured to indicate that at least two terminals within a coverage of a first cell are in the target state, the second subsequence is configured to indicate that at least two terminals within a coverage of a second cell are in the target state, and the first cell and the second cell are different cells; or wherein a time-frequency resource of a third subsequence in the predetermined subsequence set is blank in a fourth cell, and a time-frequency resource of a fourth subsequence in the predetermined subsequence set is blank in a third cell, the third subsequence is configured to indicate that at least two terminals within a coverage of the third cell are in the target state, the fourth subsequence is configured to indicate that at least two terminals within a coverage of the fourth cell are in the target state, and the third cell and the fourth cell are neighboring cells; or wherein a downlink transmission power corresponding to a time-frequency resource of the subsequence is higher than a downlink transmission power corresponding to a predetermined resource, and the predetermined resource and the subsequence occupy a same time-domain resource and different frequency-domain resources.

20. The base station according to claim 16, wherein M subsequences in the predetermined subsequence set are configured to indicate that N terminals are respectively in a wake-up state or in a sleep state, M is less than or equal to $2^N$, and M and N are positive integers; or wherein at least one subsequence in the predetermined subsequence set is a root sequence of a predetermined sequence, or is obtained from a predetermined sequence subjected to different cyclic shifts; or wherein at least two subsequences in the predetermined subsequence set are obtained from one subsequence subjected to different phase shifts; or wherein a subsequence of the predetermined subsequence set is a discontinuous transmission DTX message.

* * * * *